United States Patent [19]
Nelson

[11] Patent Number: 5,845,515
[45] Date of Patent: Dec. 8, 1998

[54] PORTABLE COOLER SYSTEM

[76] Inventor: Christy L Nelson, 3615 Decker, Moore, Okla. 73160

[21] Appl. No.: 828,044

[22] Filed: Mar. 28, 1997

[51] Int. Cl.$^6$ ....................................................... F25D 3/08
[52] U.S. Cl. ............................................ 62/457.7; 62/529
[58] Field of Search ................................... 62/371, 457.1, 62/457.2, 457.7, 372, 529

[56] References Cited

U.S. PATENT DOCUMENTS

| | | | |
|---|---|---|---|
| 601,798 | 4/1898 | Slomka | 62/457.7 |
| 882,824 | 3/1908 | Hall | 62/457.7 |
| 1,688,125 | 10/1928 | Megeath | 62/457.7 |
| 2,559,121 | 7/1951 | Hertzberg | 62/457.7 |
| 4,307,581 | 12/1981 | Reid | 62/457.1 |
| 4,551,988 | 11/1985 | Petrantoni | 62/457.1 |
| 4,910,975 | 3/1990 | Derby | 62/371 |
| 5,291,746 | 3/1994 | Abbott | 62/89 |
| 5,295,369 | 3/1994 | Garcia | 62/389 |
| 5,598,943 | 2/1997 | Markus | 220/410 |
| 5,671,611 | 9/1997 | Quigley | 62/457.7 |

*Primary Examiner*—William Doerrler

[57] ABSTRACT

A new Portable Cooler System for separating the ice from the food in the cooler. The inventive device includes a housing that fits within any brand of cooler or ice chests or can be built as an integral part of a new cooler.

6 Claims, 3 Drawing Sheets

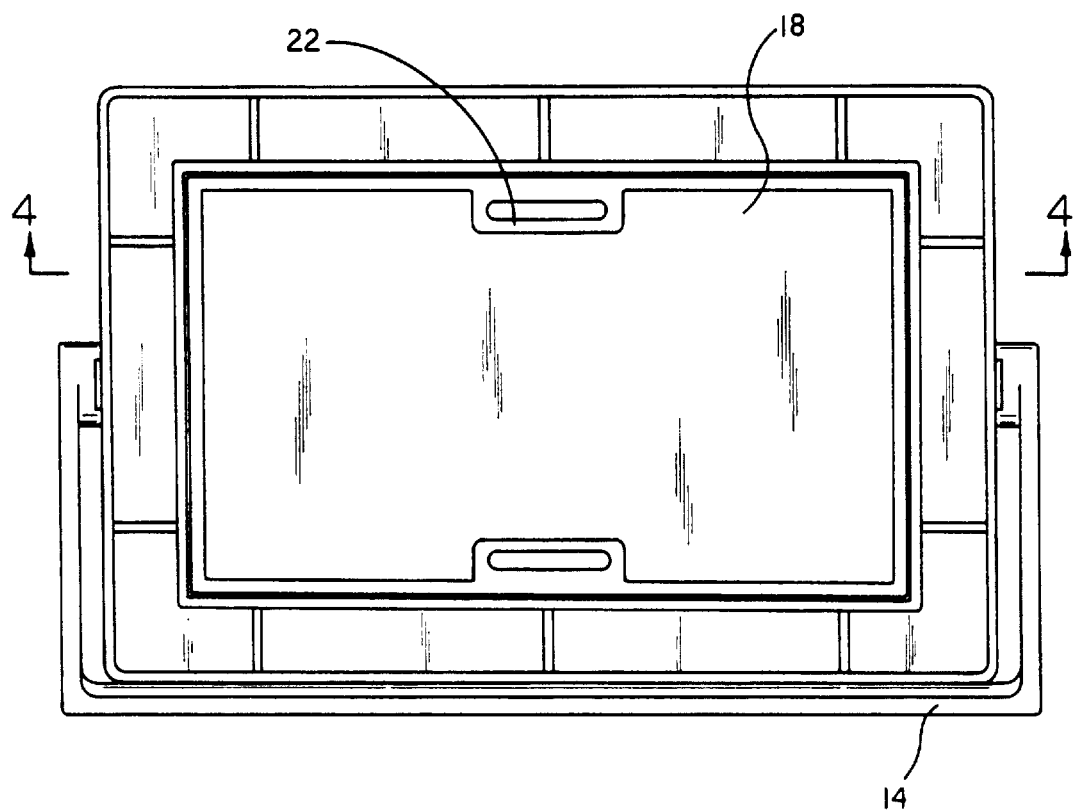
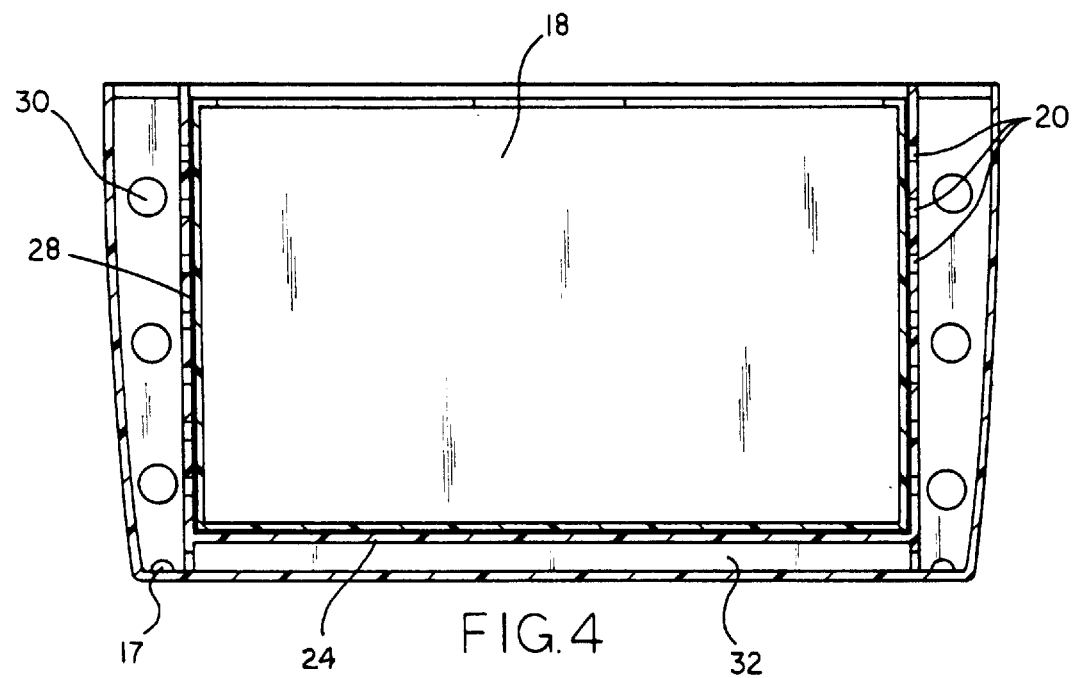

5,845,515

PORTABLE COOLER SYSTEM

BACKGROUND OF THE INVENTION

1. Field of the Invention

The present invention relates to portable coolers and more particularly pertains to a new Portable Cooler System for separating the ice from the food in the system.

2. Description of the Prior Art

The use of portable coolers is known in the prior art. More specifically, portable coolers heretofore devised and utilized are known to consist basically of familiar, expected and obvious structural configurations, notwithstanding the myriad of designs encompassed by the crowded prior art which have been developed for the fulfillment of countless objectives and requirements.

Known prior art portable coolers include U.S. Pat. No. 4,577.475; U.S. Pat. No. 5.329,787; U.S. Pat. No. 309,239; U.S. Pat. No. 3,979,007; U.S. Pat. No. 349,007 and U.S. Pat. No. 352,208.

While these devices fulfill their respective, particular objectives and requirements, the aforementioned patents do not disclose a new Portable Cooler System. The inventive device includes a housing that fits within any brand of cooler or ice chests or can be built as an integral part of a new cooler.

In these respects, the Portable Cooler System according to the present invention substantially departs from the conventional concepts and designs of the prior art, and in so doing provides an apparatus primarily developed for the purpose of separating the ice from the food in the cooler.

SUMMARY OF THE INVENTION

In view of the foregoing disadvantages inherent in the known types of portable coolers now present in the prior art, the present invention provides a new Portable Cooler System construction wherein the same can be utilized for separating the ice from the food in the cooler.

The general purpose of the present invention, which will be described subsequently in greater detail, is to provide a new Portable Cooler System apparatus and method which has many of the advantages of the portable coolers mentioned heretofore and many novel features that result in a new Portable Cooler System which is not anticipated, rendered obvious, suggested, or even implied by any of the prior art portable coolers, either alone or in any combination thereof.

To attain this, the present invention generally comprises a housing that fits within any brand of cooler or ice chests or can be built as an integral part of a new cooler.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Portable Cooler System apparatus and method which has many of the advantages of the portable coolers mentioned heretofore and many novel features that result in a new Portable Cooler System which is not anticipated, rendered obvious, suggested, or even implied by any of the prior art portable coolers, either alone or in any combination thereof.

It is another object of the present invention to provide a new Portable Cooler System which may be easily and efficiently manufactured and marketed.

It is a further object of the present invention to provide a new Portable Cooler System which is of a durable and reliable construction.

An even further object of the present invention is to provide a new Portable Cooler System which is susceptible of a low cost of manufacture with regard to both materials and labor, and which accordingly is then susceptible of low prices of sale to the consuming public, thereby making such Portable Cooler System economically available to the buying public.

Still yet another object of the present invention is to provide a new Portable Cooler System which provides in the apparatuses and methods of the prior art some of the advantages thereof, while simultaneously overcoming some of the disadvantages normally associated therewith.

Still another object of the present invention is to provide a new Portable Cooler System for separating the ice from the food in the cooler.

Yet another object of the present invention is to provide a new Portable Cooler System which includes a housing that fits within any brand of cooler or ice chests or can be built as an integral part of a new cooler.

Still yet another object of the present invention is to provide a new Portable Cooler System that in separating the ice from the food prevents the food from becoming wet and/or soggy.

Even still another object of the present invention is to provide a new Portable Cooler System that provides a more sanitary cold water supply.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top view of the present invention.

FIG. 4 is a cross-sectional view taken along line 4—4 of FIG.

DESCRIPTION OF THE PREFERRED EMBODIMENT

Figure 1:
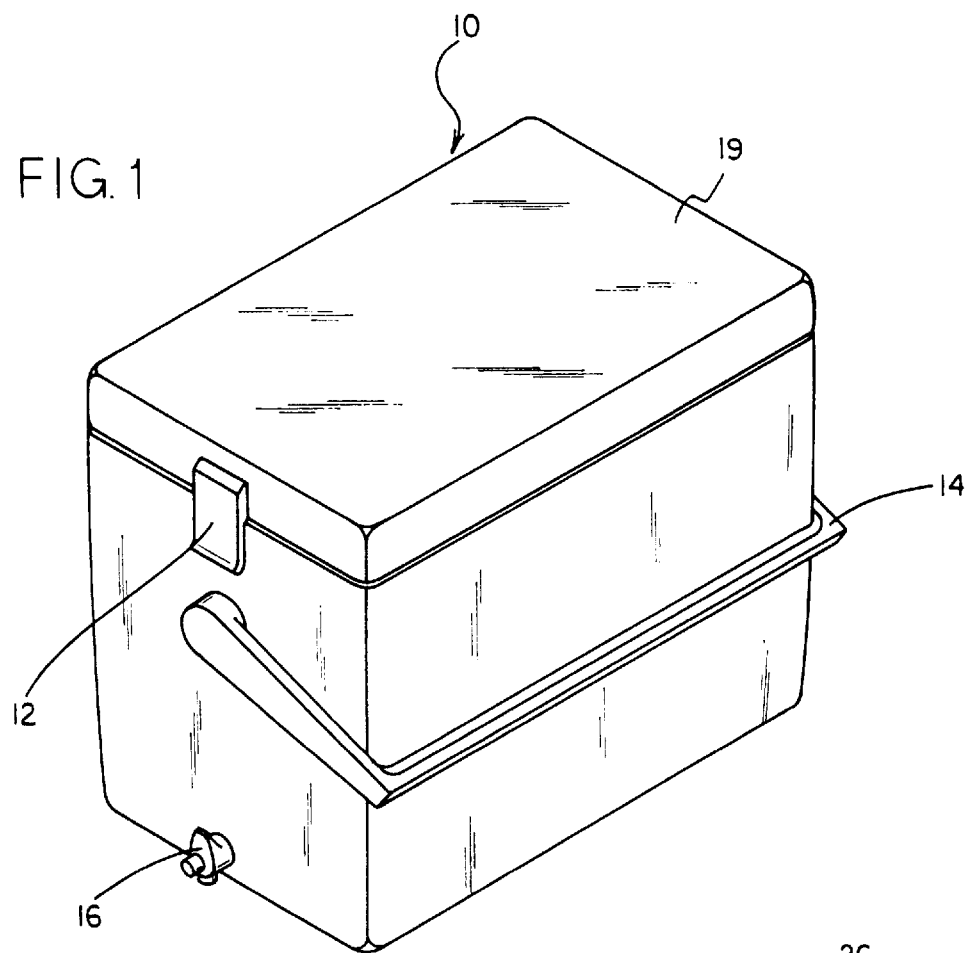
FIG. 1 is a side perspective view of a new Portable Cooler System according to the present invention.
Figure 2:
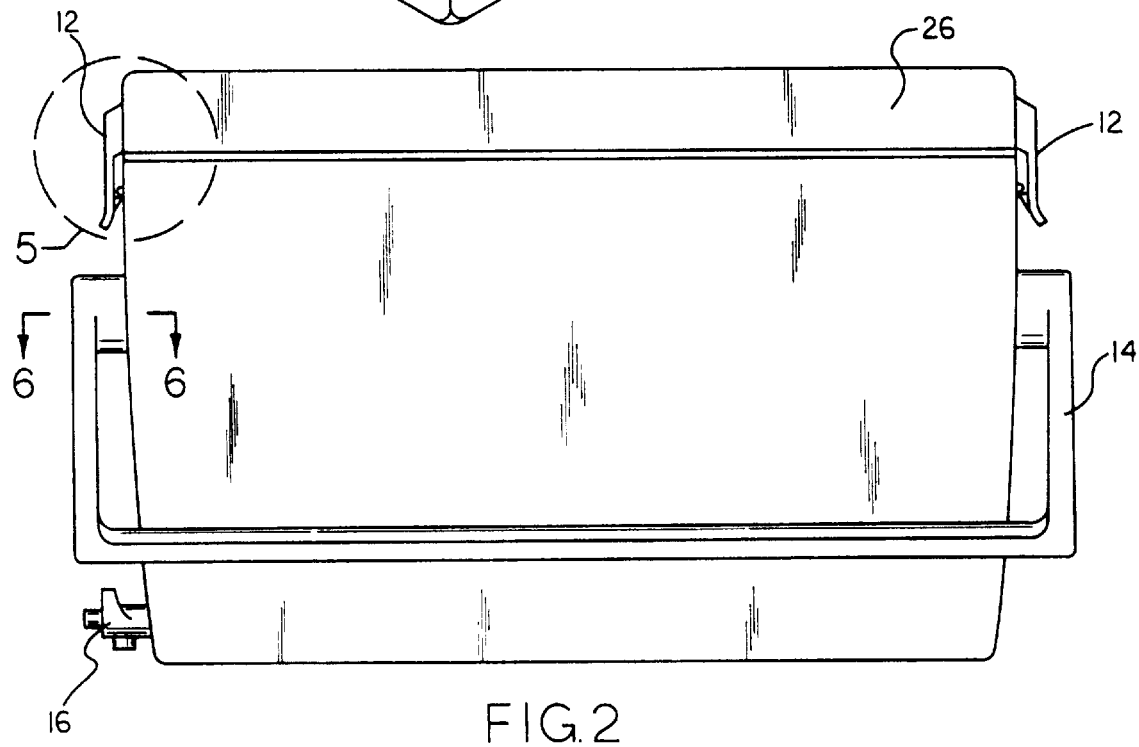
FIG. 2 is a side view of the present invention.
Figure 5:
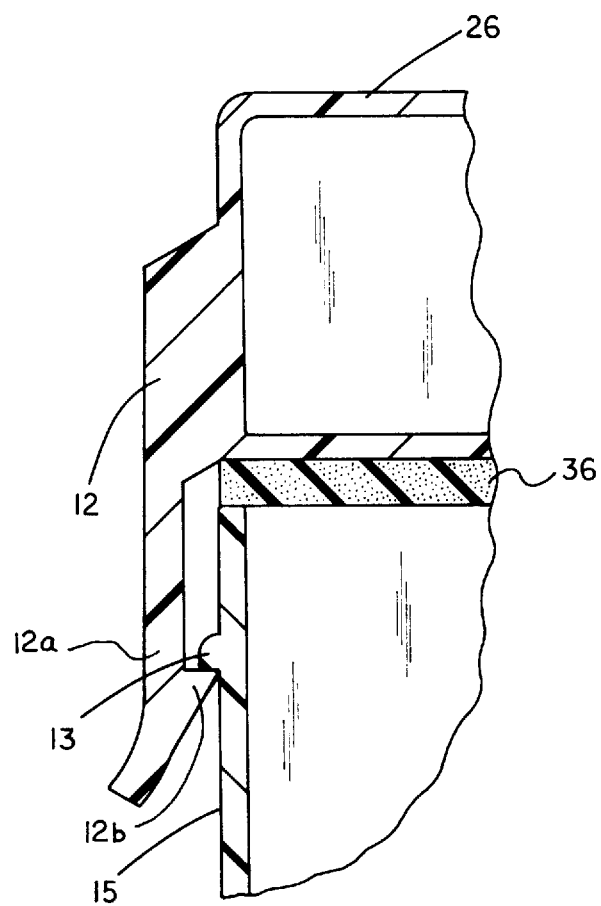
FIG. 5 is an enlarged cut-away view with the circle of FIG. 2.
Figure 6:
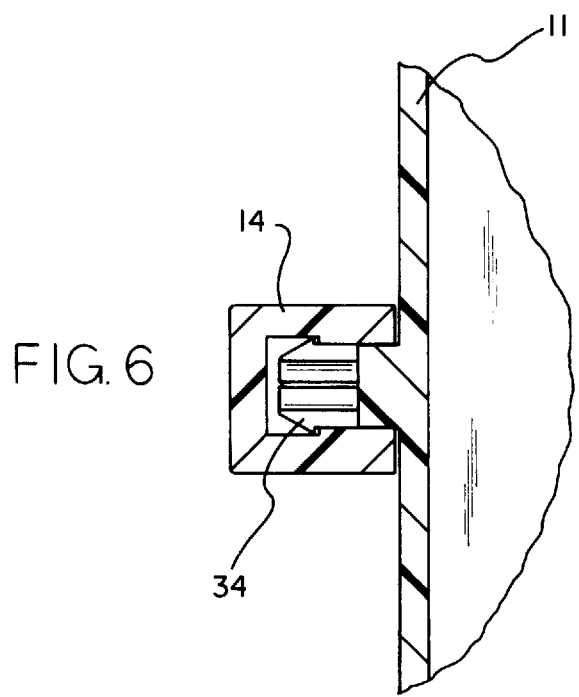
FIG. 6 is a cross sectional view taken along line 6—6 of FIG. 2.

With reference now to the drawings, and in particular to FIGS. 1 through 6 thereof, a new Portable Cooler System embodying the principles and concepts of the present invention and generally designated by the reference numeral 10 will be described.

More specifically, it will be noted that the Portable Cooler System 10 comprises a housing that fits within any brand of cooler or ice chests or can be built as an integral part of a new cooler.

As best illustrated in FIGS. 1 through 6, it can be shown that the present invention teaches a novel nonobvious Portable Cooler System that finds a need in the industry.

The present invention comprises a portable cooler system 10 having an exterior cooler wall 11 surrounding an outside of the cooler system 10. A handle 14 is attached to the exterior cooler wall 11 using an assembly piece 34 such that handle 14 may rotate freely around assembly piece 34. Handle 14 is preferably aligned parallel to a longitudinal axis of the cooler system 10. The exterior cooler wall 11 forms a generally rectangular box having an open upper end. The open upper end of the exterior cooler wall 11 is covered by a lid 19 which is held in a closed position by a pair of locking means 12. In the preferred embodiment each locking means 12 further comprises a locking member 12a extending downwardly from the lid 19. The locking member includes a triangular protrusion 12b which is positioned to engage a notch 13 which protrudes from the exterior cooler wall 11. Each notch 13 includes a rounded upper surface and a planar lower surface to facilitate closing and holding the lid 19 in a closed position.

The cooler system 10 further includes a substantially vertical interior wall 28 and a substantially horizontal bottom wall 24 which define an interior space within the cooler system 10. The interior wall 28 includes a number of apertures 20 and is held a finite distance from the exterior cooler wall 11 by a number of transverse support walls 40 positioned substantially perpendicular to and between the exterior cooler wall 11 and the interior wall 28. Each support wall 40 includes a number of flow holes 30 to allow free flow of a cooled liquid throughout the area between the exterior cooler wall 11 and the interior wall 28. The apertures 20 in interior wall 28 allow free flow of the cooled liquid into the interior area space defined by interior wall 28 and bottom wall 24. Each support wall 40 also includes a draining aperture 17 positioned adjacent a lowermost portion of exterior wall 11 to aid in total draining of the cooler system 10 through a single drain spout 16.

Apertures 20 are preferably sized smaller than flow holes 30 to prevent solids from entering into the interior space and interfering with the insertion of an inner housing 18 into the interior space.

Inner housing 18 is shaped to correspond to the interior space defined by interior wall 28 and includes an opening and a pair of oppositionally positioned handles for easy insertion and withdrawal of the inner housing 18 from the interior space. Inner housing 18 is constructed to have solid walls such that any cooled liquid within the exterior wall 11 does not enter into the inner housing 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable cooler system for keeping cooling liquids separated from items within the cooler system, the cooler system comprising:

an exterior cooler wall defining a cooler system interior;

an interior wall being held within the cooler system interior by a number of substantially vertical support stalls and a substantially horizontal bottom wall, said interior wall defining an interior space;

said interior wall being formed to have a plurality of apertures and each of said support walls having a number of flow openings for allowing fluid communication throughout said cooler system interior;

a removable inner housing being shaped to conform to said interior space, said inner housing being formed by a solid interior housing wall such that a liquid within said cooler system interior is prevented from entering an inner housing interior space; and said inner housing having a handle means for grasping said inner housing such that said inner housing can be inserted into and removed from said interior space.

2. The portable cooler system of claim 1, further comprising:

a lid for covering said cooler system, said lid having a locking means for holding said lid in relation to said exterior wall to define a closed position.

3. The portable cooler system of claim 2 wherein the locking means comprises:
   a pair of locking members disposed downwardly from said lid, each locking member having a substantially triangular protrusion;
   a pair of notches, each of said notches protruding from an outside of said exterior wall and positioned proximate a corresponding one of said pair of locking members, each of said notches having a substantially rounded upper portion and a substantially planar lower portion for engaging said triangular protrusion whereby said lid is held in said closed position.

4. The portable cooler system of claim 1 wherein each of said support walls is formed to include a draining aperture, said draining aperture being positioned adjacent a lowermost portion of said exterior wall such that a fluid within said cooler system can flow over said lowermost portion of said exterior wall.

5. A portable cooler system as in claim 4, further comprising:
   a drain spout positioned on an outside of said exterior wall, said drain spout leading into said cooler system interior such that a fluid within said cooler system interior can be drained through said drain spout.

6. A portable cooler system as in claim 1, further comprising:
   a handle coupled to an outside of said exterior wall, said handle having a longitudinal axis substantially parallel a longitudinal axis of said cooler system, said handle being coupled to said outside of said exterior wall such that said handle can rotate about said longitudinal axis of said cooler system.

* * * * *